United States Patent [19]

Howell

[11] Patent Number: 4,993,509
[45] Date of Patent: Feb. 19, 1991

[54] VEHICLE HAND CONTROL DEVICE

[76] Inventor: Keith Howell, R.R. #6, Frederiction, New Brunswick, Canada, E3B 4X7

[21] Appl. No.: 474,521

[22] Filed: Feb. 2, 1990

[51] Int. Cl.$^5$ .............................................. B60K 26/00
[52] U.S. Cl. .................................. 180/333; 180/315; 180/320; 74/471 R; 74/481
[58] Field of Search .............. 180/315, 321, 318, 320, 180/333, 332; 188/74, 341, 171; 74/471 R, 480 R, 471, 484 R, 478

[56] References Cited

U.S. PATENT DOCUMENTS

| | | | |
|---|---|---|---|
| 3,885,448 | 5/1975 | Beals et al. | 180/315 |
| 4,140,200 | 2/1979 | Tucek | 180/333 |
| 4,158,968 | 6/1979 | Wilson et al. | 180/333 |
| 4,238,972 | 12/1980 | Hemens | 180/333 |
| 4,476,954 | 10/1984 | Johnson | 180/333 |
| 4,603,752 | 8/1986 | Chambers et al. | 180/333 |
| 4,645,030 | 2/1987 | von Bernuth et al. | 180/333 |
| 4,690,241 | 9/1987 | Miyadera | 180/315 |
| 4,716,980 | 1/1988 | Butler | 180/315 |
| 4,755,100 | 7/1988 | Schultz et al. | 180/333 |

Primary Examiner—Richard A. Bertsch
Attorney, Agent, or Firm—Charles J. Prescott

[57] ABSTRACT

A vehicle hand control device operable to control the brake pedal or accelerator pedal of a motor vehicle. The device includes an elongated support tube connectable to and along the steering column of the vehicle, a control arm tube pivotally connected at one end to, and extending from, the upper end of the support tube, and a slender, elongated control arm mounted for rotation only within the control arm tube. The control arm includes an elongated handle extending from one end of the control arm, the handle preferably having its longitudinal axis disposed from the longitudinal axis of the control arm. A control arm lever is connected at the other end of the control arm which also extends somewhat beyond the end of the control arm tube. An elongated accelerator pedal rod is operably connectable at each end between the distal end of the control arm lever and the vehicle's accelerator pedal, respectively, for controlling the accelerator pedal in response to rotational movement of the control arm about its longitudinal axis by corresponding movement of the handle. An elongated brake pedal rod may also be provided operably connectable at each end between the other end of the control arm tube and the vehicle's brake pedal, respectively, for controlling the brake pedal in response to pivotal movement of the control arm about the pivotal connection between the control arm tube and the support tube.

5 Claims, 2 Drawing Sheets

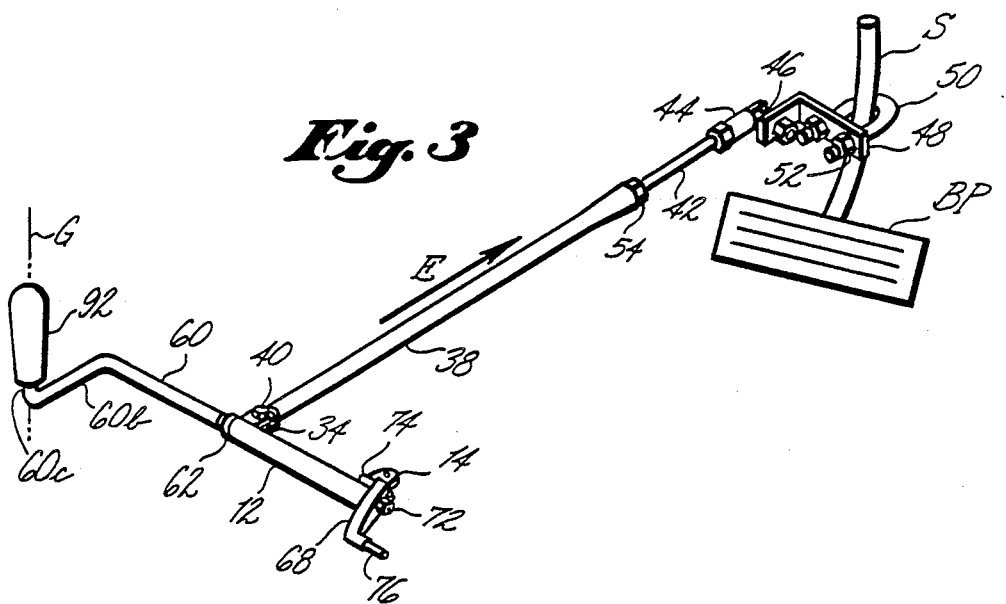
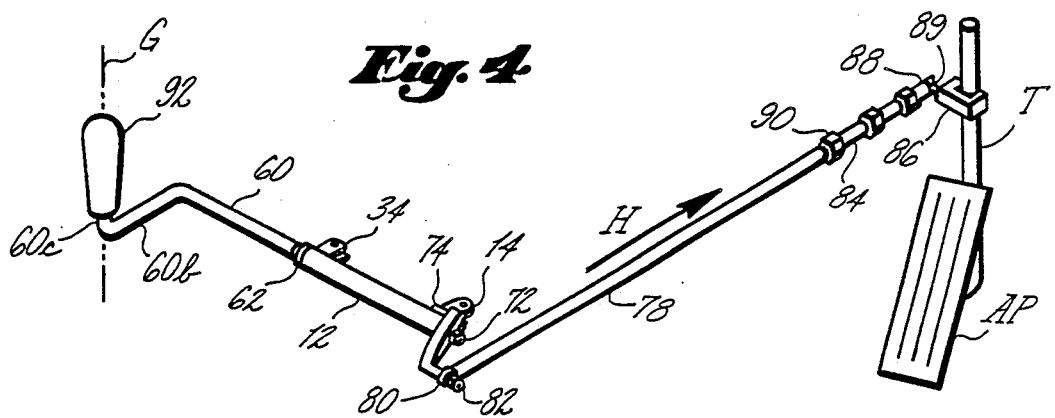
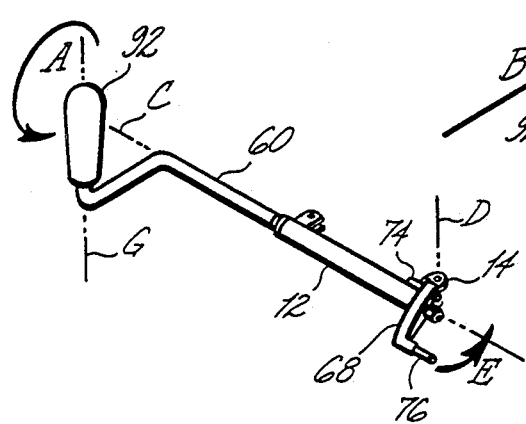

VEHICLE HAND CONTROL DEVICE

BACKGROUND OF THE INVENTION

The present invention relates generally to manual control devices for automotive vehicles.

Applicant is aware of a number of both patented and unpatented devices for manually controlling the brake and/or accelerator pedals of automotive vehicles. The inventors and the respective patent numbers of which applicant is aware of as follows:
 Pawl 3,275,093
 Bhattacharya 4,143,734
 Appley 4,228,865
 Dowden, et al. 4,438,835
 Johnson, et al. 4,476,954
 Ahnafield 4,722,416

A number of unpatented devices are also known to applicant. One such device is distributed by the Ricon Corporation of Sun Valley, Calif., which activates the throttle of the accelerator and brake pedals by a push-pull motion of the longitudinal handle. A very similar device is marketed by Manufacturing and Production Services Corporation of San Diego, Calif. Applicant is also aware of the hand control device manufactured and marketed by Handicaps, Inc., which activates responsive rods to forward pivotal movement and downward pivotal movement of the elongated control arm, respectively.

Applicant's invention is directed to a unique vehicle hand control device which activates the accelerator pedal by rotation of a control arm about its longitudinal axis via manual corresponding rotation of a uniquely configured handle. Separately, the brake pedal of the vehicle is activated by a forward pushing motion of the handle which pivots the control arm about its pivotal connection to a supporting control arm tube positioned adjacent the vehicle's steering column.

BRIEF SUMMARY OF THE INVENTION

This invention is directed to a vehicle hand control device operable to control the brake pedal or accelerator pedal of a motor vehicle. The device includes an elongated support tube connectable to and along the steering column of the vehicle, a control arm tube pivotally connected at one end to, and extending from, the upper end of the support tube, and a slender, elongated control arm mounted for rotation only within the control arm tube. The control arm includes an elongated handle extending from one end of the control arm, the handle preferably having its longitudinal axis disposed from the longitudinal axis of the control arm. A control arm lever is connected at the other end of the control arm which also extends somewhat beyond the end of the control arm tube. An elongated accelerator pedal rod is operably connectable at each end between the distal end of the control arm lever and the vehicle's accelerator pedal, respectively, for controlling the accelerator pedal in response to rotational movement of the control arm about its longitudinal axis by corresponding movement of the handle. An elongated brake pedal rod may also be provided operably connectable at each end between the other end of the control arm tube and the vehicle's brake pedal, respectively, for controlling the brake pedal in response to pivotal movement of the control arm about the pivotal connection between the control arm tube and the support tube.

It is therefore an object of this invention to provide a vehicle hand control device which includes unique structure and function facilitating more easily controlled brake and accelerator pedal operation.

It is another object of this invention to provide a vehicle hand control device which offers a unique mode of operation and control arm and handle structure so that both brake and accelerator pedal control may be accomplished while the same hand is in close proximity to the steering wheel of the vehicle.

In accordance with these and other objects which will become apparent hereinafter, the instant invention will now be described with reference to the accompanying drawings.

BRIEF DESCRIPTION OF THE DRAWINGS

FIG. 3 is a perspective view of the control arm within the control arm support tube interconnected to the brake pedal of the vehicle.

FIG. 4 is a perspective view of the control arm within the control arm support tube interconnected to the accelerator pedal of the vehicle.

FIG. 5 is a perspective view of the control arm, control arm tube and control arm lever demonstrating the axial rotational movement of the control arm to effect accelerator pedal control.

FIG. 6 is a perspective view of the control arm, control arm tube and control arm lever demonstrating the pivotal movement of the control arm to effect brake pedal control.

DETAILED DESCRIPTION OF THE INVENTION

Figure 1:
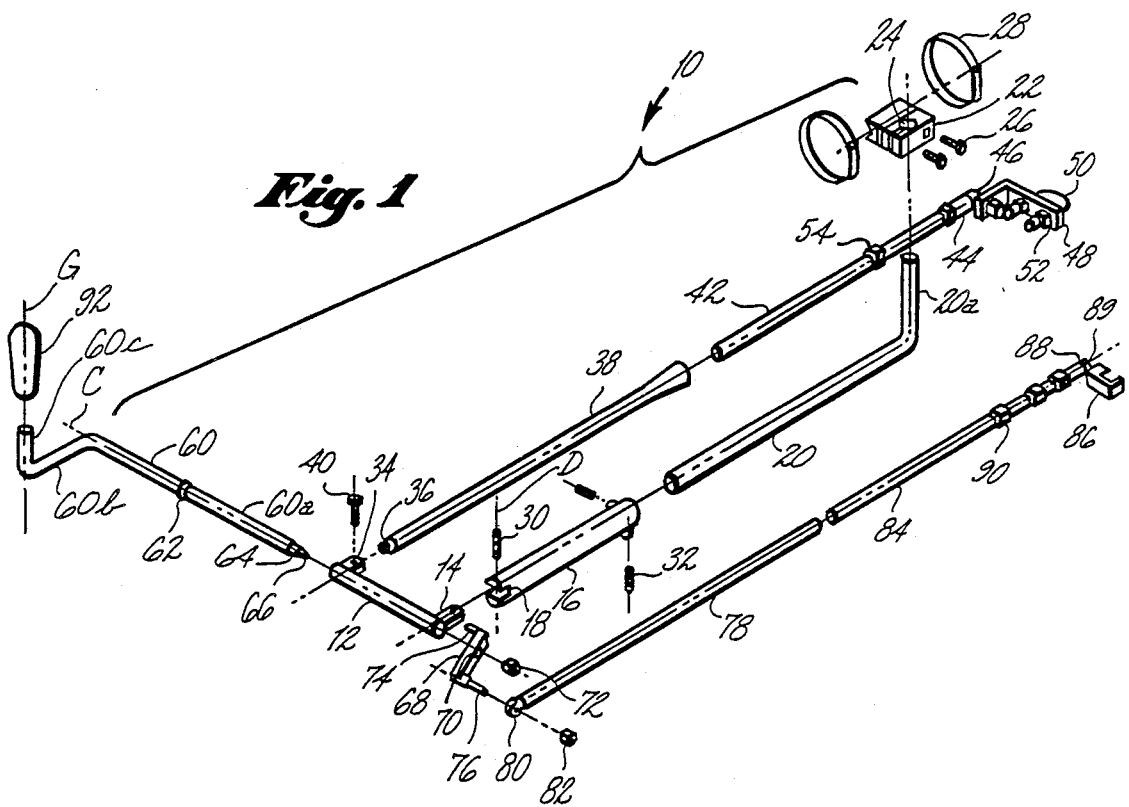
FIG. 1 is an exploded perspective view of the preferred embodiment of the invention.
Figure 2:
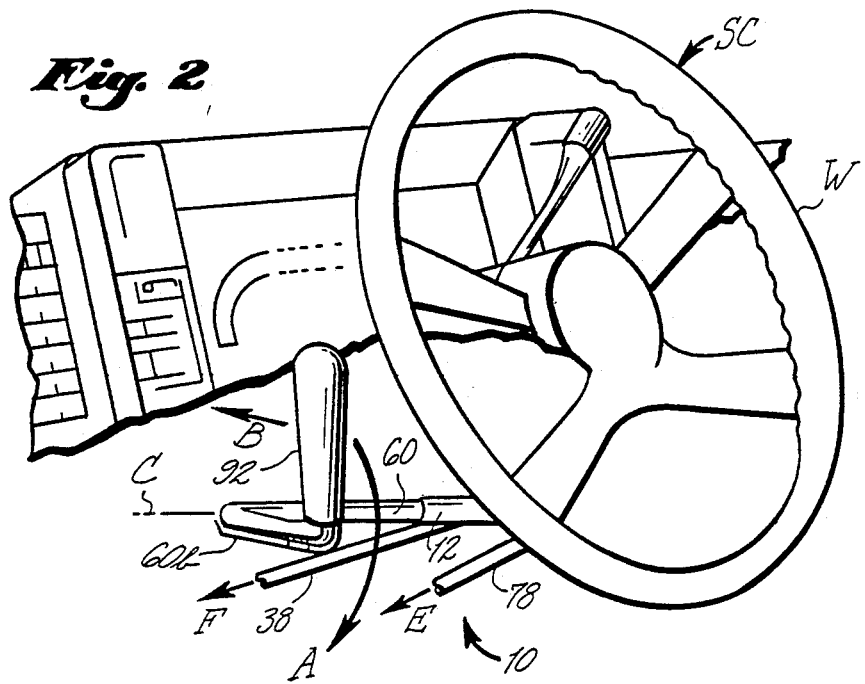
FIG. 2 is a perspective view of the left side of the dash, panel and steering wheel of an automotive vehicle showing a portion of the preferred embodiment in position with respect thereto.

Referring now to the drawings, and particularly to FIGS. 1 to 4, the preferred embodiment of the invention is shown generally at numeral 10. The invention 10 includes an elongated support means having a support tube 16 and a center support rod 20. The support tube 16 is notched at 18 at its upper end and also includes set screws 32 which matably engage within threaded cavities adjacent the lower end of support tube 16. The elongated center support rod 20 is sized to slidably mate longitudinally within support tube 16 whereupon set screws 32 act to releasably secure the axial and rotational orientation with respect to these components 16 and 20 in a preselected arrangement.

Center support rod 20 is L-shaped at 20a so as to matably engage within an aperture in mounting block 22. Threaded fasteners 26 interengagable into mating apertures in mounting block 22 serve to clamp center support rod portion 20a thereinto, thus also securing their chosen relationship one to another. Hose or band clamps 28 serve to interengage around the lower elongated steering tube portion of steering column SC while also supportively engaging within slots formed into mounting block 22 as shown so as to secure the mounting block 22 to the steering column SC.

Thus, by this arrangement, support tube 16 is securely positionable in adjustable fashion with respect to height and rotational and axial positioning below the steering column SC.

A control arm tube 12 is also provided having a bracket 14 disposed at one end and extending therefrom. Bracket 14 includes an aperture whereby bracket 14 is matably insertible into notch 18 whereupon pin 30 connects support tube 16 and control arm tube 12 for pivotal motion only of control arm tube 12 about the longitudinal axis D of pin 30.

A control arm 60 is formed of an elongated shaft having a first end portion 60a which is divided from the remainder of the control arm 60 by enlarged boss 62. Control arm portion 60a is fully insertible longitudinally within control arm tube 12 whereby the entire control arm 60 may be axially rotated coaxially with control arm tube 12 about axis C. After control arm first portion 60a is fully inserted within control arm tube 12 against boss 62, spline 64, extends axially from the end of control arm tube 12 for preselected fixed engagement within mating aperture 70 of control arm lever 68. Lock nut 72, threadably engagable onto the threaded portion 66, serves to lockably engage this arrangement.

Thus far described, then, as control arm 60 is rotated about its longitudinal axis C, control arm lever 68 rotates a corresponding amount. To effect easy and controlled axial rotation of control arm 60, handle 92 is provided. This handle 92 covers upright portion 60c of control arm 60. Rearwardly extending portion 60b interconnects upright portion 60c and the main longitudinal portion of control arm 60. This arrangement creates an offset with respect to the longitudinal axis G of handle 92 and longitudinal axis C of control arm 60 as shown.

Clevis 34 of control arm tube 12 is structured for pivotal interengagement by threaded fastener 40 to the apertured upper end 36 of brake connecting tube 38. Brake connecting tube 38 is threadably engagable over brake rod 42 and their actual axial relationship one to another is secured by lock nut 54. The lower end of brake rod 42 is threadably engaged within sleeve 44 which includes a universally connected shaft 46 laterally extending therefrom. Shaft 46 is lockably engaged within bracket 48 which supports clamp 50 within mating apertures in bracket 48. By this arrangement, clamp 50 lockably engages around the shank S of brake pedal BP for secure lockable engagement therebetween as best seen in FIG. 3.

An accelerator connecting tube 78 is universally connected at end 80 onto shaft 76 which extends from control arm lever 68 as best seen in FIGS. 1 and 3. Lock nut 82, which threadably engages over the end of shaft 76, maintains this arrangement. Accelerator rod 84 is provided for telescoping interengagement within accelerator connecting tube 78 and lock nut 90 serves to maintain that relationship with respect to compression forces associated with these members 78 and 84. The lower end of accelerator rod 84 is threadably engaged within sleeve 88 which includes a laterally extending shaft 89 which is universally mounted within sleeve 88. Shaft 89 is threadably engagable within bracket 86 which, in turn, is lockably engagable around throttle bar T of accelerator pedal AP as best seen in FIG. 4.

Stop 74, integral with control arm lever 68, serves to limit the axial rotation of control arm 60 about axis C within control arm tube 12 by its contact against bracket 14. By proper adjustment of lock nut 90, stop 74 will contact bracket 14 at engine idle speed.

Referring additionally to FIGS. 5 and 6, the mode of operation of the invention 10 is there shown. In FIG. 5, the activation of the accelerator pedal connecting means is there shown wherein handle 92 is rotated in the direction of arrow A about longitudinal axis C. This causes control arm lever 68 to rotate about longitudinal axis C in the direction of arrow E, thus displacing accelerator connecting tube 78 generally in the direction of arrow H adjacent thereto in FIG. 4.

In FIG. 6, the mode of applying brake pedal BP motion is there shown. When handle 92 is manually moved in the direction of arrow B, control arm 60 is pivoted about pivotal axis D of bracket 14. Clevis 34 is thus moved in the direction of the arrow F and brake connecting tube 38 is moved toward brake pedal BP that same amount F as shown in FIG. 3.

A unique feature offered by the structure of the present invention is with respect to the offset axial orientation of the longitudinal axis G of handle 92 with respect to the longitudinal axis C of control arm 60. As may now better be appreciated with respect to FIG. 2, the handle 92 may be manually activated to either apply motion to the brake pedal, or to control the accelerator pedal AP with the palm of the hand placed atop handle 92 to rotate handle 92 in the direction of arrow A while the thumb portion of the hand retains control of the steering wheel W. Thus, for short periods of time, steering and throttle control may be maintained in one-handed fashion. Because of the offset of axis G with respect to longitudinal axis C, only a slight downward pressure applied to the upper end of handle 92 will result in the desired degree of axial rotation of control arm 60 in the direction of arrow A.

Adjustability of the brake pedal connecting means, the accelerator pedal connecting means and the support means, including the support tube 16 telescopically engaged over the center support rod 20, are all securely adjustable so as to adapt the device to each particular vehicle environment.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A vehicle hand control device operable to control an accelerator pedal of an automotive vehicle, comprising:
   an elongated support means for stationary connection to a steering column of the vehicle;
   said support means having a first end pivotally connected to a first end of a control arm tube whereby said control arm tube is held for pivoting only about its said first end;
   said control arm tube also having a second end and formed of an elongated tubular member which extends from said pivotal connection from said first end of said support means;
   a control arm having a first end and a second end and a mid portion and formed of a slender, elongated shaft having a handle extending from said first end, said handle positionable adjacent a steering wheel of the steering column;
   said control arm connected and supported along its length between said second end and said mid portion coaxially within said control arm tube for rotation only;

a control arm lever having first and second ends and connected at said first end to, and radially extending from, said control arm second end;

an elongated accelerator pedal connecting means operably connectable at each end between said control arm lever second end and the accelerator pedal, respectively, for controlling the accelerator pedal in response to rotational movement of said control arm coaxially within said control arm tube by corresponding manual rotational movement of said handle.

2. A vehicle hand control device as set forth in claim 1, further comprising:

an elongated brake pedal connecting means operably connectable at each end between said control arm tube second end and the brake pedal, respectively, for controlling the brake pedal in response to pivotal movement of said control arm within said control arm tube about said pivotal connection between said control arm tube first end and said support means first end by corresponding manual pivotal movement of said handle;

3. A vehicle hand control device as set forth in claim 2, wherein said support means, said brake pedal connecting means, and said accelerator pedal connecting means are adjustable in length.

4. A vehicle hand control device as set forth in claim 1, wherein:

said handle has a longitudinal axis which is spaced from, and generally perpendicular to, the longitudinal axis of said control arm.

5. A vehicle hand control device as set forth in claim 4, further comprising:

stop means connected to said control arm lever for limiting axial rotation of said control arm.

* * * * *